United States Patent [19]

Takimoto

[11] 4,004,100
[45] Jan. 18, 1977

[54] GROUP FRAME SYNCHRONIZATION SYSTEM

[75] Inventor: Yukio Takimoto, Tokyo, Japan

[73] Assignee: Nippon Electric Company, Ltd., Tokyo, Japan

[22] Filed: Aug. 11, 1975

[21] Appl. No.: 603,903

[30] Foreign Application Priority Data

Aug. 14, 1974 Japan .............................. 49-93000

[52] U.S. Cl. ............................................ 179/15 BS
[51] Int. Cl.² ......................................... H04J 3/06
[58] Field of Search ...................... 179/15 BS, 15 A; 178/69.5 R, 67

[56] References Cited

UNITED STATES PATENTS

| | | | |
|---|---|---|---|
| 3,537,069 | 10/1970 | Van de Houten | 179/15 BS |
| 3,571,516 | 3/1971 | Ohyama | 179/15 BS |
| 3,736,507 | 5/1973 | Wolejsza | 178/67 |
| 3,763,318 | 10/1973 | Ross | 179/15 A |
| 3,766,316 | 10/1973 | Hoffman | 178/69.5 R |
| 3,809,817 | 5/1974 | Gill | 179/15 BS |
| 3,854,011 | 12/1974 | Mallory | 178/69.5 R |
| 3,883,729 | 5/1975 | de Cremiers | 178/69.5 R |

Primary Examiner—David L. Stewart
Attorney, Agent, or Firm—Sughrue, Rothwell, Mion, Zinn & Macpeak

[57] ABSTRACT

A group frame synchronization system establishes the frame synchronization to a plurality of time-division multiplexed digital signals by the use of a common synchronization code pattern. The common synchronization code pattern and mutually time-shifted codes of identical pattern are respectively inserted at the transmitting end into vacant time slots of the respective digital signals. At the receiving end, the group frame synchronization signals are extracted and fed to an exclusive OR circuit whose output signal is applied to the group frame synchronization circuit.

6 Claims, 13 Drawing Figures

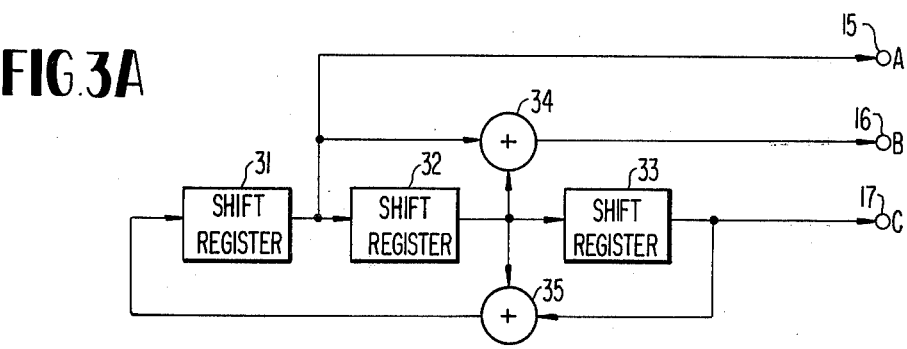
FIG.3A
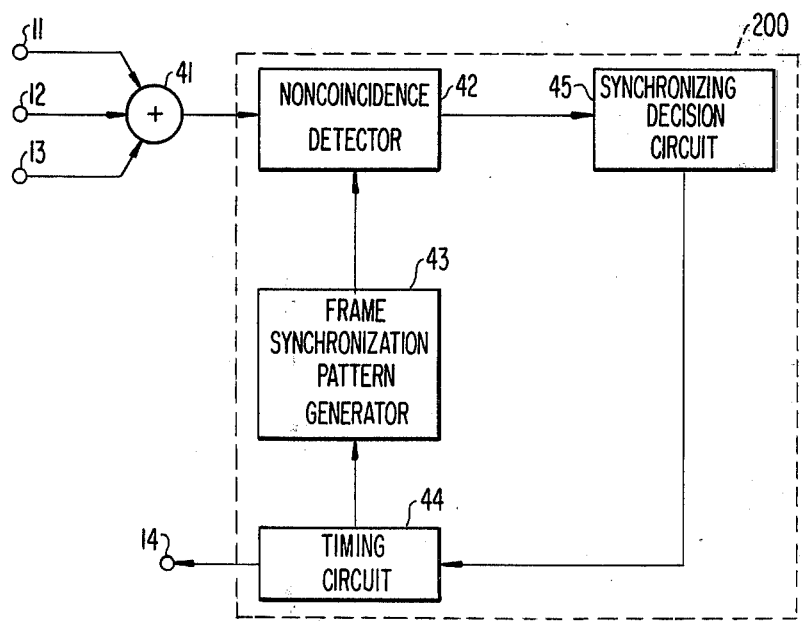
FIG.3B
FIG.4

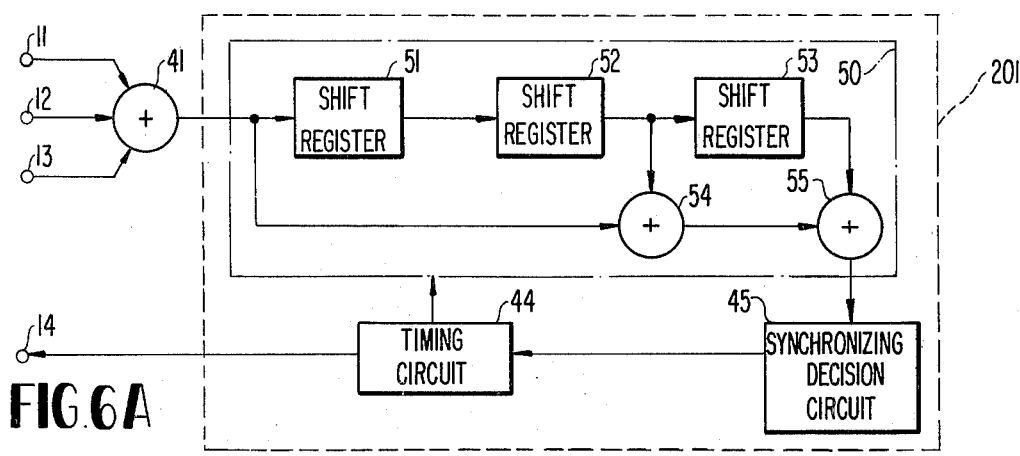
FIG.6A
FIG.6B
| 41 OUTPUT | - | 0 | 0 | 1 | 0 | 1 | 1 | 1 | 0 | 0 | 1 | 0 | 0* | 1 | 1 | 0 | 0 | 1 | - | - | - | - | - |
|---|---|---|---|---|---|---|---|---|---|---|---|---|---|---|---|---|---|---|---|---|---|---|---|
| 51 OUTPUT | - | - | 0 | 0 | 1 | 0 | 1 | 1 | 1 | 0 | 0 | 1 | 0 | 0 | 1 | 1 | 0 | 0 | - | - | - | - | - |
| 52 OUTPUT | - | - | - | 0 | 0 | 1 | 0 | 1 | 1 | 1 | 0 | 0 | 1 | 0 | 0 | 1 | 1 | 0 | - | - | - | - | - |
| 53 OUTPUT | - | - | - | - | 0 | 0 | 1 | 0 | 1 | 1 | 1 | 0 | 0 | 1 | 0 | 0 | 1 | 1 | - | - | - | - | - |
| 55 OUTPUT | - | - | - | - | 0 | 0 | 0 | 0 | 0 | 0 | 0 | 0 | 1* | 0 | 1* | 1* | 0 | 0 | - | - | - | - | - |
TIME ⟶
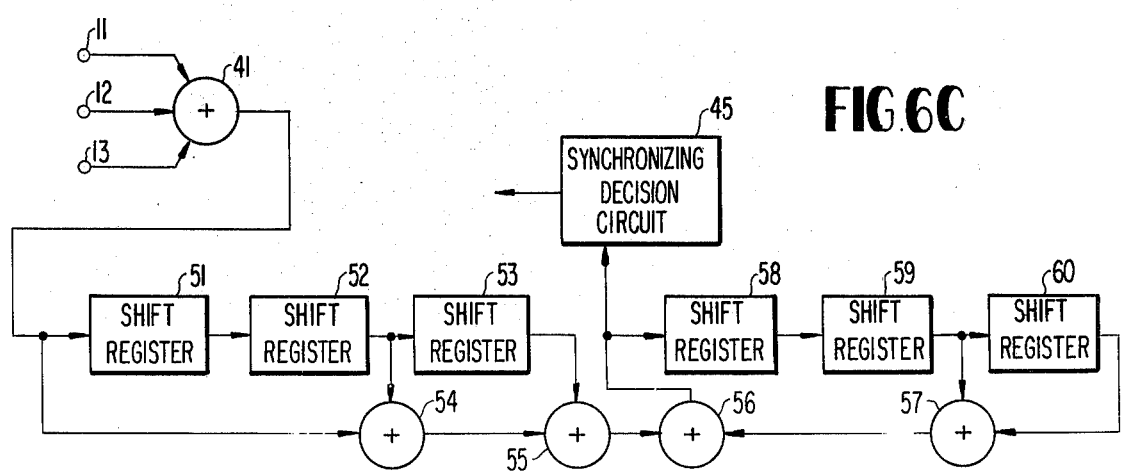
FIG.6C

FIG. 7A
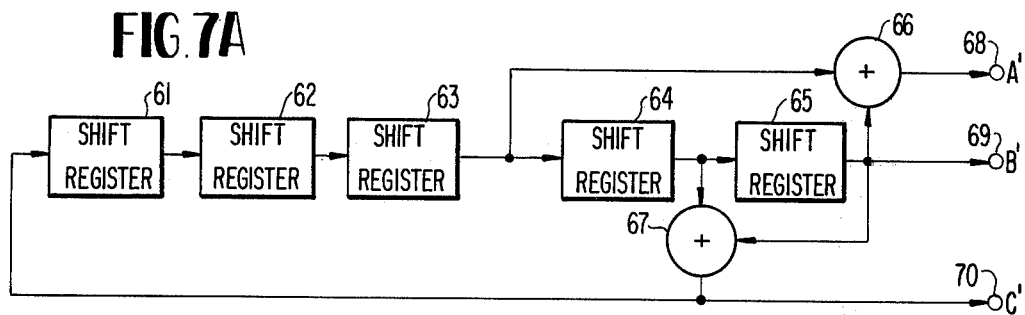
FIG. 7B
| 61 | 62 | 63 | 64 | 65 | A' | B' | C' | A'⊕B'⊕C' |
|---|---|---|---|---|---|---|---|---|
| 1 | 1 | 1 | 1 | 1 | 0 | 1 | 0 | 1 |
| 0 | 1 | 1 | 1 | 1 | 0 | 1 | 0 | 1 |
| 0 | 0 | 1 | 1 | 1 | 0 | 1 | 0 | 1 |
| 0 | 0 | 0 | 1 | 1 | 1 | 1 | 0 | 0 |
| 0 | 0 | 0 | 0 | 1 | 1 | 1 | 1 | 1 |
| 1 | 0 | 0 | 0 | 0 | 0 | 0 | 0 | 0 |
| 0 | 1 | 0 | 0 | 0 | 0 | 0 | 0 | 0 |
| 0 | 0 | 1 | 0 | 0 | 1 | 0 | 0 | 1 |
| 0 | 0 | 0 | 1 | 0 | 0 | 0 | 1 | 1 |
| 1 | 0 | 0 | 0 | 1 | 1 | 1 | 1 | 1 |
| 1 | 1 | 0 | 0 | 0 | 0 | 0 | 0 | 0 |
| 0 | 1 | 1 | 0 | 0 | 1 | 0 | 0 | 1 |
| 0 | 0 | 1 | 1 | 0 | 1 | 0 | 1 | 0 |
| 1 | 0 | 0 | 1 | 1 | 1 | 1 | 0 | 0 |
| 0 | 1 | 0 | 0 | 1 | 1 | 1 | 1 | 1 |
| 1 | 0 | 1 | 0 | 0 | 1 | 0 | 0 | 1 |
| 0 | 1 | 0 | 1 | 0 | 0 | 0 | 1 | 1 |
| 1 | 0 | 1 | 0 | 1 | 0 | 1 | 1 | 0 |
| 1 | 1 | 0 | 1 | 0 | 0 | 0 | 1 | 1 |
| 1 | 1 | 1 | 0 | 1 | 0 | 1 | 1 | 0 |
| 1 | 1 | 1 | 1 | 0 | 1 | 0 | 1 | 0 |
TIME →
FIG. 7C
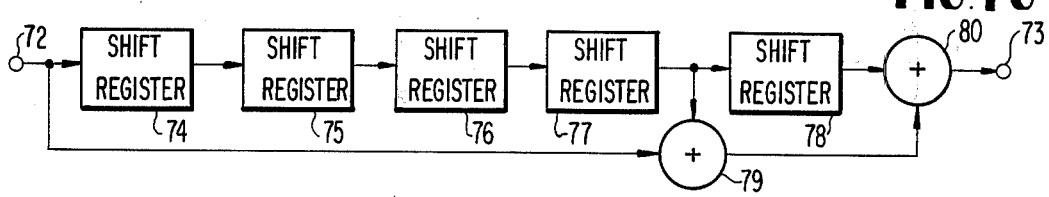
FIG. 7D
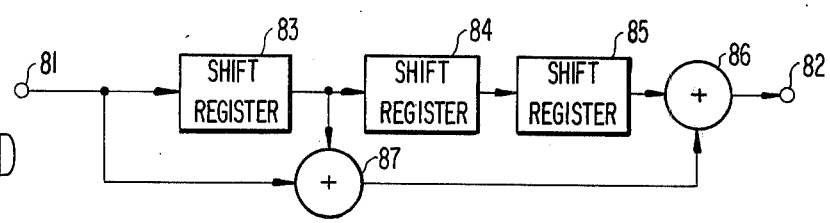

GROUP FRAME SYNCHRONIZATION SYSTEM

BACKGROUND OF THE INVENTION

This invention relates to a group frame synchronization system for the parallel transmission of a plurality of digital signals such as a plurality of time-division multiplexed telephone signals and, more particularily, to a group frame synchronization system for establishing the group frame synchronization between those digital signals, which are transmitted in parallel by the PSK(Phase-Shift-Keying)-modulation of a carrier wave of extremely high frequency region such as the millimeter band.

In the conventional group frame synchronization system of this kind, a plurality of mutually synchronized digital signals are respectively converted at the transmitting end to signals of a higher bit rate. Then group frame synchronization signals are inserted into the vacant time slots obtained as a result of the bit-rate conversion. After the synchronization pattern insertion, those digital signals are usually transmitted in parallel by the PSK-modulation of a carrier wave of millimeter or quasi-millimeter band. In the case of a four-phase PSK system, two signals can be transmitted in parallel according to such method. Similarly, in the case of an eight-phase PSK system, three signals can be transmitted in parallel. Beside the PSK modulation, a multi-level amplitude modulation system or a combined phase-amplitude modulation system may also be used.

At the receiving end, the inserted group frame synchronization signals are extracted from the transmitted digital signals, thereby to separate those transmitted digital signals from one another. The separated digital signals are then subjected to a bit rate reduction so that the original bit rate may be restored. Based on the respective individual frame synchronization signals included therein, the digital signals are respectively channel-separated to reproduce analog signals such as telephone signals.

In the conventional group frame synchronization of this type, a framing signal detector and a frame synchronization are needed for each one of the digital signals to be transmitted. Furthermore, the use of the mutually different frame synchronization code patterns needed for such conventional systems has generally necessitated the provision, at the receiving end, of the frame synchronization signal generators equal in number to the digital signals to be transmitted in parallel.

On the other hand, in the parallel transmission of a plurality of digital signals by the use of a carrier wave of millimeter or quasi-millimeter band, the so-called scrambling is applied at the transmitting end to each digital signal at an interval corresponding to the group frame synchronization signal. At the receiving end, the transmitted digital signal is descrambled to maintain the transmission quality of the time-division multiplexed channels. Further, in some cases, all the digital signals are transmitted with monitoring information superposed thereon or inserted therein in common to monitor the transmission line. To achieve the scrambling and the monitoring information insertion economically, the frame construction must be identical for all the digital signals so that they may be controlled in common. However, the conventional frame synchronization system does not permit this easily because the synchronization pattern is different from one digital signal to another.

SUMMARY OF THE INVENTION

Accordingly, the object of the present invention is to provide a group frame synchronization system capable of achieving the group frame synchronization for a plurality of parallel transmission digital signals by the use of a common synchronization code pattern.

Another object of the present invention is to provide an inexpensive group frame synchronization system wherein the synchronization control means at both the transmitting and receiving ends are arranged in common to all the parallel transmission digital signals.

In the group frame synchronization system of the present invention, a common synchronization code pattern and mutually time-shifted codes of identical pattern are respectively inserted at the transmitting end into vacant time slots of the respective digital signals as the group frame synchronization signals. At the receiving end, the group frame synchronization signals are extracted respectively from the digital signals transmitted in parallel, and then those extracted synchronization signals are fed to an exclusive OR circuit, whose output signal is applied to the group frame synchronization circuit. In this synchronization circuit, the comparision of the output of the exclusive OR circuit with the output of frame synchronization pattern generator bit-synchronized with the received digital signals provides a synchronization error signal, which is supplied to the conventional frame synchronization circuit to restore the synchronized state through the known techniques of one-bit-shift or resetting.

BRIEF DESCRIPTION OF THE DRAWINGS

The above and other objects, features, and advantages of the present invention will become apparent from the following description when taken in conjunction with the accompanying drawings, which illustrate some preferred embodiments of the invention.

In the drawings:

FIG. 3A is a block diagram showing in detail one example of the frame synchronization signal generator shown in FIG. 2;

FIG. 3B is a table of the series of binary states obtainable at various points in the circuit shown in FIG. 3A;

FIG. 4 is a block diagram of a group frame synchronization device shown in FIG. 1;

FIG. 6A illustrates another form of group frame synchronizing device embodying the present invention;

FIG. 6B is a table of the series of binary states obtainable at various points in the circuit shown in FIG. 6A;

FIG. 6C illustrates a further form of frame synchronization device embodying the present invention;

FIG. 7A illustrates another form of framing signal generator usable in the present invention;

FIG. 7B is a table of the series of binary states obtainable at various points in the circuit shown in FIG. 7A; and FIGS. 7C and 7D illustrate respective forms of non-coincidence circuit usable with the arrangement of FIG. 7A.

DESCRIPTION OF THE PREFERRED EMBODIMENTS

Figure 1:
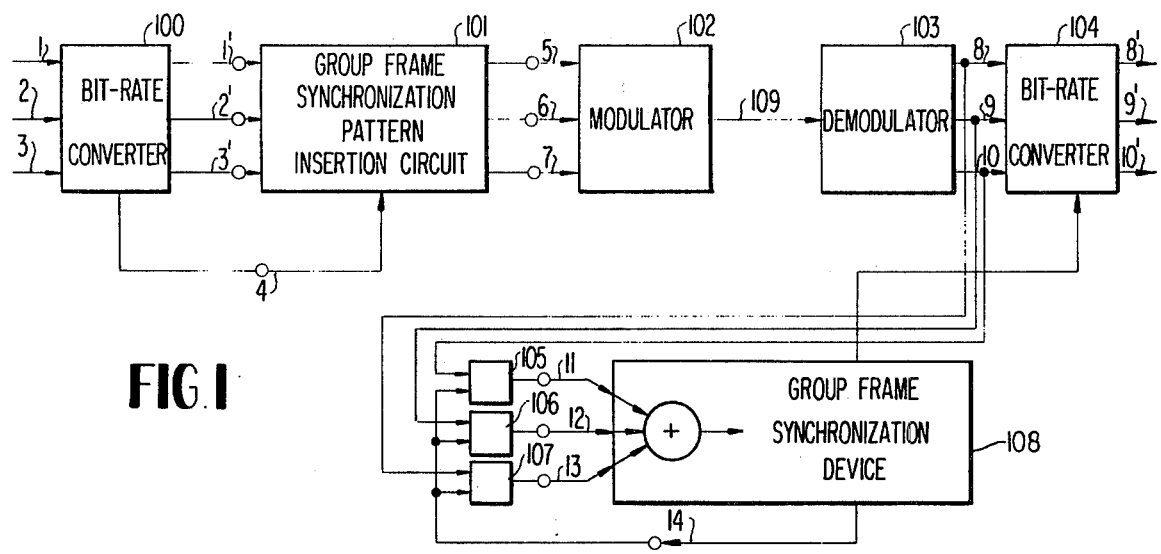
FIG. 1 is a block diagram illustrating one example of a group frame synchronization system.

Referring to FIG. 1 showing in block diagram form a millimeter wave communication system to which the group frame synchronization system is applied, three time-division multiplexed telephone (TDM) signals are supplied in parallel through terminals 1, 2 and 3 to a bit-rate converter 100 for increasing the bit rate to provide vacant time slots for the insertion of the group frame synchronization pattern to be described hereinafter. It is assumed here that the incoming TDM signals are synchronized with one another. The bit-rate-converted TDM signals are supplied respectively througn terminals 1', 2' and 3' to a group frame synchronization pattern insertion circuit 101, which is also supplied through a terminal 4 with a clock pulse synchronized with all the incoming TDM signals. The group synchronization pattern may be disposed at the beginning or the end of each frame or, alternatively, it may be distributed suitably within a frame in a predetermined manner. After the insertion of the group synchronization pattern at the circuit 101, the TDM signals are caused to PSK-modulate a carrier wave of millimeter based at a PSK modulator 102. It is to be noted here that since there are three TDM signals to be transmitted, they are translated into an 8-phase PSK-modulated carrier wave for transmission. After modulation, the carrier wave is transmitted through a transmission line 109.

In reception, the transmitted carrier wave is demodulated at a demodulator 103, and the three bit-rate-increased TDM signals are reproduced there. These reproduced signals are then supplied to AND gates 105, 106 and 107 and also to a bit-rate converter 104 through the wirings 8, 9, and 10. The outputs of the AND gates 105, 106 and 107 are supplied through terminals 11, 12 and 13 to a frame synchronization device 108, which delivers clock pulses through a terminal 14 to the AND gates 105, 106, and 107. The clock pulses are also supplied to the bit-rate converter 104, which delivers the reproduced signals through wirings 8', 9', and 10' after the bit-rate conversion.

These TDM signals are then respectively subjected to channel separation and decoding for the reproduction of the multiplexed telephone signals.

Figure 2:
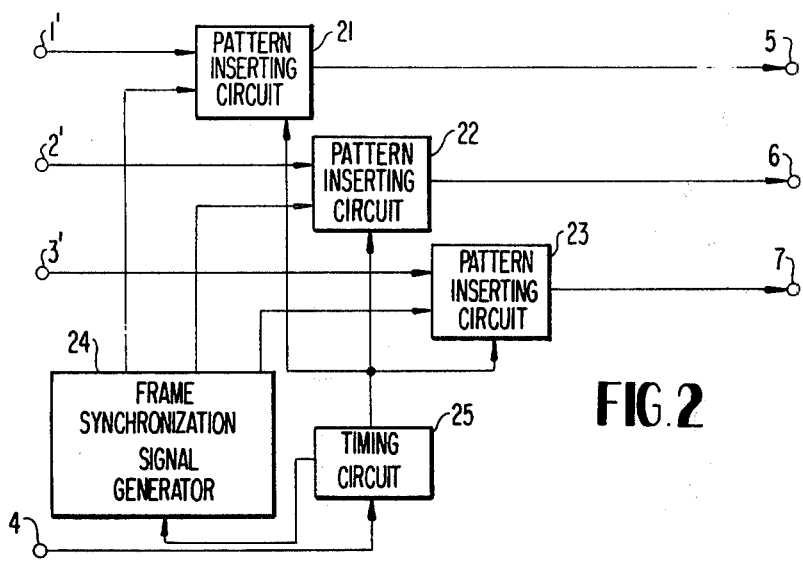
FIG. 2 is a block diagram illustrating one example of a group frame synchronization pattern insertion circuit shown in FIG. 1.

In the frame synchronization pattern insertion circuit shown in FIG. 2, three digital signals, each including time slots for the insertion of a frame synchronization signal, are fed through terminals 1', 2' and 3' to pattern inserting circuits 21, 22 and 23, which are also fed with respective frame synchronization signals generated by a frame synchronization signal generator 24 in a pseudo-random pattern and in time-shifted relation to each other. Timing pulses, which are in synchronism with the digital signals being fed through the terminals 1', 2' and 3', are fed through another terminal 4 to a timing circuit 25 which produces a timing signal for driving the frame synchronization signal generator 24 and also a timing signal for driving the pattern inserting circuits 21, 22 and 23 whereby the frame synchronization signals shifted in time relative to each other and of the same pattern are inserted into time slots provided in the respective digital signals.

The frame synchronization signal generator 24 is constructed, for example, as shown in FIG. 3A and includes three stages of shift register 31, 32 and 33 and exclusive OR circuits 34 and 35. As observed, the outputs of the first and second stage shift registers 31 and 32 are fed to the exclusive OR circuit 34 and the outputs of the second and third stage shift registers 32 and 33 are fed to the exclusive OR circuit 35, the output of which is fed back to the first stage shift register 31. With this arrangement, there are obtained 7-bit binary signals of the same pattern time-shifted from each other at respective points in the circuit, as listed in FIG. 3B. The signals obtained at the respective output terminals 15, 16 and 17 of the first stage register 31, the exclusive OR circuit 34 and the last stage register 33 are fed to the pattern inserting circuits 21, 22 and 23 of FIG. 2 as frame synchronization signals for the respective digital signals.

Figure 5:
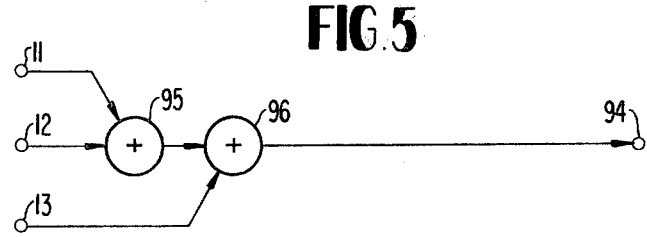
FIG. 5 illustrates the structure of the three-input exclusive OR circuit shown in FIG. 4.

Referring to FIG. 4, which illustrates a frame synchronization device embodying the present invention, frame synchronization signals extracted from the respective digital signals are supplied through terminals 11, 12 and 13 to an exclusive OR circuit 41, which Modulo 2 adds all input signals and may be constructed, for example, as shown in FIG. 5, thereby to obtain a logical exclusive OR function of the signals fed through terminals 11 and 12 at a gate 95 and a further logical exclusive OR function of the output gate 95 and the signal through the terminal 13 at another gate 96. With this arrangement, the output 94 of the exclusive OR circuit 41 or of the gate 96 appears in a pattern of (0010111), as indicated in column $A \oplus B \oplus C$ of FIG. 3B, and fed to a noncoincidence detector circuit 42 at one of its two inputs, as shown in FIG. 4. Reference numeral 43 indicates a frame synchronization pattern generator provided in the group frame synchronization device at the receiving end, which is of substantially the same construction as that described previously with reference to FIG. 3A, and to which a timing signal is fed from a timing circuit 44 so as to cause the contents of shift registers 31, 32 and 33, provided in the pattern generator 43, to start with 011 at the time of arrival of the frame synchronization signals. In this manner, the above-referred-to-code pattern (0010111) is provided periodically for each frame at the output terminal 8 of the first shift register of the pattern generator 43 and fed to the other input of the noncoincidence detector 42. This detector compares the two inputs thereto with each other to produce an output 0 or 1 depending on whether they coincide or not. Such output of non-coincidence detector 42 is led to a synchronization decision circuit 45 to be integrated therein and, if the integral average exceeds a predetermined value, it is decided that the system is out of synchronism. Upon this decision, the synchronization decision circuit 45 produces a signal which is fed to the timing circuit 44 to shift it into correct phase relation. The signal output of the timing circuit 44 is fed through a terminal 14 to AND gates 105, 106 and 107 and bit-rate converter 104 of the receiving equipment and utilized for de-scrambling or for extracting the frame synchronization signal or monitoring information signals. Reference numeral 200 indicates a frame synchronization circuit. Since the circuits except the exclusive OR circuit 41 in FIG. 4 are well-known, no further description will be given here.

It is to be noted that frame synchronization may be effected with no provision of any frame synchronization pattern generator, as for example shown in FIG.

6A. The circuit arrangement shown in FIG. 6A is usable for frame synchronization of digital signals of a frame construction of the sequential type, but is particularly advisable for use with digital signals having a frame construction of the interleaving type.

With the case of the interleaving type of frame construction, the frame synchronization is effected not on a sub-frame by sub-frame basis but on a frame basis even when scrambling, de-scrambling or monitoring is effected on a sub-frame basis and, accordingly, the time required for one-bit-shift recovery of synchronism must be considerably long. Use of the circuit shown in FIG. 6A, however makes it readily feasible to recover synchronization upon a sub-frame basis and obtain a much reduced recovery time even when framing signals of a substantially extended period are employed.

In FIG. 6A, the framing signal for each of the three signals is fed through respective terminals 11, 12 and 13 to an exclusive OR circuit 41, the output of which is of the pattern (0010111), as stated hereinbefore, and led to a pattern detector 50 to be successively registered therein under the control of timing circuit 44. In the pattern detector 50, which includes three stages of shift register 51, 52 and 53, an exclusive OR function of the input to the first stage register 51 and the output of the second stage register 52 is obtained at a gate 54 and a further exclusive OR function of the output of the gate 54 and the output of the last stage register 53 is obtained at another gate 55. The output of the pattern detector 50 or that of gate 55, which is fed to the circuit 45, is held at the state 0 as long as the framing signals are being received correctly, as illustrated in FIG. 6B. If, however, an error is found in the framing signals received, for example, as indicated by an asterisk (*) in FIG. 6B, the state 1 is produced at the output of circuit 45. Accordingly, frame synchronization can be effected with the circuit of FIG. 6A in the same manner as with the case of FIG. 4. It is to be noted, however, that, with the circuit of FIG. 6A, pattern detection can be effected independently of the initial phase of the pattern fed to the shift register set, and this enables frame synchronization to be effected on a sub-frame basis. Thus, the number of shifts required to recover synchronism by the one-bit-shift method can be largely reduced and an accordingly reduced recovery time obtained.

Though in the above description seven-bit M sequence signals (pseudo-random sequence signals) have been employed as framing signals, it is to be understood that use can also be made of signals other than those of M sequence and, in general, signals of any linear shift register sequence obtainable by means of shift registors and logical exclusive OR functions thereof can be employed as framing signals. Reference numeral 201 in FIG. 6 indicates a frame synchronization circuit. In FIG. 6A, if a framing error is found, three bits of 1 are produced in the detector output in a pattern of 1011, as shown in FIG. 6B. Arrangement may, however, be made so that there occurs only a single bit of 1 in the four-bit pattern. One example of such arrangement is illustrated in FIG. 6C, in which the output of gate circuit 55 is fed to a further exclusive OR circuit 56, the output of which is fed not only to the synchronization decision circuit 45 but also to the first stage 58 of another three-stage shift register set 58, 59 and 60. An exclusive OR function of the outputs of the second and last stage registers 59 and 60 is obtained at a gate circuit 57 and fed back to the exclusive OR circuit 56. As will be noted, with this arrangement, there is obtained a single occurrence of a 1 in the detector output for each single error detected.

FIG. 7A illustrates a device for generating a linear shift register series signal, which includes five stages of shift registers 61 to 65, a gate circuit 66 for obtaining an exclusive OR function of the outputs of the third and last registers 63 and 65, and another gate circuit 67 for obtaining an exclusive OR function of the outputs of the fourth and last registers 64 and 65. As listed in FIG. 7B, the contents of shift registers 61 to 65 and signals A', B' and C' produced at the respective output terminals 68, 69 and 70 of the gate circuit 66, the last stage register 65 and the gate circuit 67 are all of the same pattern and different in phase relative to each other. With such signals A', B' and C' used as framing signals at the transmitting end of the system, framing signals as obtained at the receiving end exhibit a pattern reduced in length of period, (1110100), as shown in column A' + B' + C' of FIG. 7B. Accordingly, non-coincidence detection can be effected by feeding such framing signals to a circuit including appropriate shift register and exclusive OR means, for example, as shown in FIGS. 7C or 7D.

Though description has been made herein with the assumption that frame synchronization signals are inserted simultaneously for different digital signals, it will be apparent that the present invention can also be applied to those systems in which frame synchronization signals are inserted in shifted time relation by employing at the receiving end appropriate delay elements to place the frame synchronization signals in coincident relation with each other between the digital signals.

It will be appreciated from the foregoing description that, according to the present invention, in a digital transmission system in which linear shift-register sequence signals are inserted as frame synchronization signals in respective digital signals in time-shifted relation to each other, frame synchronization can be effected by feeding a logical exclusive OR function of the framing signals to a single noncoincidence detector or a pattern detector and in this manner all the digital signals of the system can be monitored continuously.

What is claimed is:

1. A group frame synchronization system for establishing the frame synchronization in common to a plurality of time-division multiplexed digital signals of a common bit rate to be transmitted through a common carrier wave, comprising: means at the transmitting end for inserting identical but time-shifted group frame synchronization pseudo-random sequence code patterns respectively into said digital signals, said time-shifting being by an interval equal to an integral multiple of the clock pulse period corresponding to said common bit rate; and at the receiving end, means for extracting said synchronization pseudo-random sequence code patterns from said digital signals derived from the transmitted carrier wave, gate means for obtaining the exclusive -OR function of said synchronization pseudo-random sequence code patterns supplied from said extraction means, and means for establishing the group frame synchronization among said digital signals in response to the output signal of said gate means.

2. The synchronization system claimed in claim 1, wherein said synchronization establishing means includes: means coupled to the output of said gate means for detecting said frame synchronization pseudo-random sequence code patterns; means coupled to the output of said pattern detection means for deciding a state of frame synchronization; and means connected between the input of said pattern detection means and the output of said synchronization decision means for generating timing pulses synchronized with said digital signals and time-shifted when supplied with the output of said synchronization decision means.

3. The pattern detection means claimed in claim 2, wherein said frame synchronization pattern extracting means includes: a frame synchronization pseudo-random sequence code pattern generator; and means for comparing the output signals of said gate means with the output signals of said frame synchronization pattern generator.

4. The synchronization system claimed in claim 3, wherein said inserting means includes: a plurality of pattern inserting circuits for receiving said plurality of time-division multiplexed digital signals and inserting said synchronization pseudo-random sequence code patterns into said digital signals; a frame synchronization signal generator for generating synchronization pseudom-random sequence code patterns, said generator supplying time-shifted code patterns to each of said pattern inserting circuits; and means responsive to the bit rates of said digital signals for generating timing pulses for said pattern inserting circuits and said frame synchronization signal generator.

5. The synchronization system claimed in claim 4, wherein said frame synchronization signal generator includes: first shift register means having a plurality of stages shifting in response to said timing pulses; and gate means for obtaining the exclusive-OR functions of the outputs of selected stages of said first shift register means and providing a feedback to the input of the first stage of said first shift register means, said identical but time-shifted code patterns being derived from selected stages of said first shift register means and exclusive -OR functions of selected stages.

6. The synchronization system claimed in claim 5, wherein said frame synchronization pattern generator includes: second shift register means receiving as its input the exclusive-OR function of said synchronization code patterns and having a plurality of stages shifting in response to said timing pulses; and gate means for obtaining the exclusive-OR function of the outputs of selected stages of said second shift register means for generating output signals.

* * * * *